July 12, 1927.  
G. SPURGEON  
1,635,351  
STORAGE BATTERY TERMINAL CONNECTION  
Filed June 30, 1922
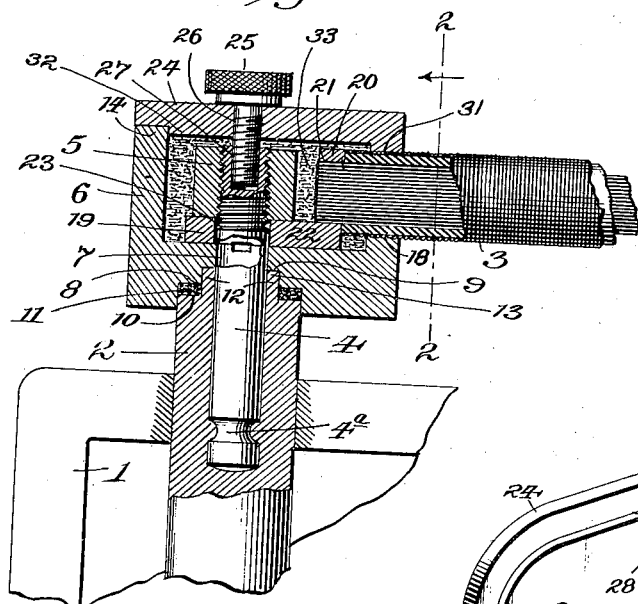
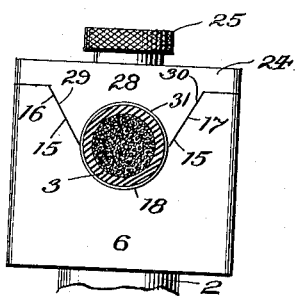
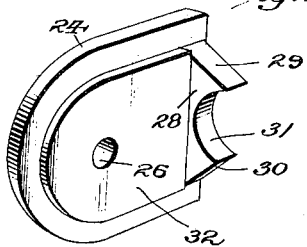
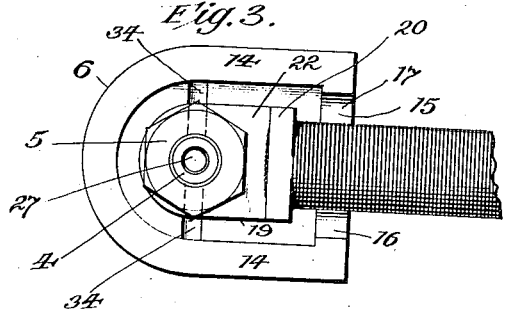
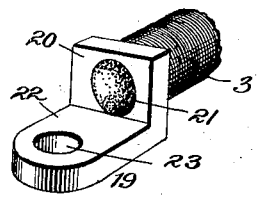
Inventor  
Glenn Spurgeon,  
By Dodge and Sons,  
Attorneys.

Patented July 12, 1927.

1,635,351

UNITED STATES PATENT OFFICE.

GLENN SPURGEON, OF HILLISBURG, INDIANA.

STORAGE-BATTERY TERMINAL CONNECTION.

Application filed June 30, 1922. Serial No. 571,871.

The present invention pertains to storage battery terminal connections.

Among the principal objects sought to be accomplished by the invention is the provision of a connection of the type mentioned that is efficiently protected at all times from corrosion. Such a connection is secured in the present instance by suitably enclosing the corrosive parts and maintaining them in a bath of a corrosion-preventing compound, such, for instance, as vaseline, grease or tallow, or a mixture of these. The enclosing parts of the connection are particularly designed to prevent leakage of the corrosion-preventing compound which, of course, is most likely to occur in the presence of excessive heat.

The improved terminal connection is also constructed so that it may be adjusted horizontally to any position according to the arrangement of the electrical conductor with reference to the battery. This adjustment permits the cables to be connected to the battery without the necessity of forming sharp bends therein which tend to fracture the insulation on the cables. It is also a particular advantage that with the horizontal adjustment mentioned, after the cables have been disconnected, repairs may readily be made to the battery without interference from the connection parts since they may be swung around out of the way as desired.

The present invention provides a simple, durable connection which does not require the use of special tools in order to assemble the parts for connecting and or disassemble the parts for connecting and disconnecting the cables or even when removing or replacing all of the parts of the terminal connection.

Additional advantages of the improved construction will appear from the following detailed description and the accompanying drawing showing the preferred embodiment of the invention as now used and in which, like reference numerals indicating the same parts in the several views, Figure 1 represents a longitudinal vertical section taken through the center of the device, as it appears in actual use on a storage battery with a cable in place;

Fig. 2, a sectional view taken on line 2—2 of Fig. 1, showing the manner in which the enclosing or casing members are clamped about the cable in order to prevent leakage of the corrosion-preventing substance;

Fig. 3, a plan view of the device as shown in Fig. 1, with the upper casing member or cover removed;

Fig. 4, a perspective view showing the construction of the under side of the cover; and Fig. 5, a fragmentary perspective view of the connecting member attached to the end of the cable.

In the drawing, Fig. 1, 1 represents a battery and 2 one of the usual lead terminals or posts of the battery to which the insulated cable 3 is attached by the improved connection forming the subject-matter of the present invention. Permanently secured in the upper end of terminal 2 is a stud 4, preferably of brass, and having its upper portion threaded to receive a nut 5. Stud 4 is preferably secured in the end of the lead battery terminal 2 by casting the terminal about the lower part of the stud 4 during the manufacture of the terminal. In order to secure a greater adhesion of the two members, the lower portion of stud 4 is provided with a knurled and tinned surface. A circumferential fillet 4ᵃ near the lower end of stud 4 also adds to the strength of the connection between the parts.

Although the preferred manner of connecting terminal 2 and stud 4 has been described, it is contemplated that these parts may be connected in any other suitable manner.

On the upper end of terminal 2 is mounted the lower enclosing or casing member 6 of the improved connection which is adapted to receive the corrosion-preventing substance for protecting the parts of the connection against the acid fumes from the battery.

Member 6 is preferably of lead and is provided in its bottom wall with an opening 7 through which stud 4 and into which terminal 2 project. Opening 7 is of several diameters, decreasing upwardly so as to form a lower circumferential shoulder 8 and an upper circumferential shoulder 9 in the bottom wall of casing member 6.

The diameter of the lowermost portion of opening 7 is substantially the same as that of post or terminal 2 so that when the parts are in place, terminal 2 projects slightly into opening 7 and thus aids in centering and properly locating the parts with reference to each other. The upper end of terminal 2 has a lower circumferential shoulder 10, on which is positioned a suitable washer or other packing member 11, and an axial extension 12 which latter forms with stud 4 an upper circumferential shoulder 13. Thus, as shown in Fig. 1, it will be seen that, when in place, upper shoulder 9 of casing member 6 rests on upper shoulder 13 formed by terminal 2 and stud 4 to support member 6 on the terminal, while the upper end of the main body or terminal 2, as heretofore stated, projects slightly into the lower end of opening 7 to secure packing 11 in place between shoulder 10 of the terminal and shoulder 8 of casing member 6.

Casing member 6 is formed with an upstanding peripheral wall 14. At one end of member 6, wall 14 is provided with a slot 15 having downwardly inclined converging sides 16, 17. At its lower extremity 18, slot 15 is curved to receive insulated cable 3, as shown in Figs. 1, 2 and 3.

In Figs. 1 and 3 there is shown the connecting member 19 which is attached to the end of cable 3 so that the latter may be connected readily to the battery terminal. Connecting member 19, preferably of brass, is L-shaped, the upright portion 20 thereof being provided with an opening 21 into which the bared end of cable 3 is secured, preferably by soldering so as to make a good electrical contact therewith. The horizontal portion 22 of connecting member 19, which is slightly longer than upright portion 20, is also provided with an opening 23 through which the upper end of stud 4 projects when the parts of the connection are in place, as shown in Figs. 1 and 3.

The upper casing member or cover 24 is secured in place on the lower casing member 6 by means of a thumb screw 25 which passes down through an opening 26 in cover 24 and engages with a threaded opening 27 provided in the upper end of stud 4 for this purpose. The upper portion of thumb screw 25 is heavily tinned in order to protect it from corrosion. Cover 24, which is of lead, is provided at the end where cable 3 enters the lower casing member 6 with a depending portion 28 having inclined edges 29, 30 corresponding to the inclined edges 16, 17 of casing member 6 and on its lower edge a curved face 31, which latter, together with the curved surface 18 of casing member 6, forms a circular opening for cable 3. It will thus be seen that when the parts are in place, as shown in Fig. 1 of the drawing, and thumb screw 25 is screwed down into place, the depending portion 28 on the cover will be forced tightly into place in the corresponding slot 15 in casing member 6, tightly clamping the cable 3 in place and thus providing a tight joint between the cable and the casing members which serves to prevent the possible leakage of the corrosion-preventing substance at this point.

Cover member 24 is also provided on its under face with a projecting portion 32 which fits snugly into the upper end of member 6 to prevent leakage of the corrosion-preventing substance 33 with which the lower casing member 6 is filled.

In order that the corrosion-preventing substance in casing member 6 may have free access to all parts of the brass stud 4, the bottom of member 6 is provided in its upper face with a small channel or groove 34 which intersects opening 7 and is made of sufficient length so that its outer ends extend beyond the outer edge of connecting member 19 on either side thereof when the parts are assembled for use.

By the described construction a connection is provided wherein the cable is connected to the terminal within a fluid-tight casing comprising lower member 6 and cover 24, all possible leakage of the corrosion-preventing substance within the casing being prevented by the provision of tight joints between the cover and member 6, and at the entrances of both the conductor 3 and terminal 2 into the casing. Hence, all of the parts of the connection which are subject to corrosion are enclosed and always submerged in the corrosion-preventing substance, while protection of the exposed or outer surfaces of the connection parts from corrosion is secured by either heavily tinning these parts or having them made of lead. It is also to be noted that the presence of the corrosion-preventing substance in the casing acts as a seal and prevents the entrance of air and the acid fumes from the battery at the points where the cable and the battery terminal enter the casing.

Numerous changes in the details of construction of the connection shown in the accompanying drawing and described in the specification are contemplated without departing from the spirit of the invention, except as the same may be limited by the appended claims.

What is claimed is:—

1. The combination of a storage battery terminal provided with a threaded extension; an open-top casing mounted on the upper end of said terminal and having said terminal extension projecting therein through an opening in the bottom of said casing; an electrical conductor having one of its ends projecting into said casing through a side of the casing; a connecting member attached to said end of the conductor within the casing and having an opening in its outer end through which said terminal extension projects; a nut on the threaded portion of said terminal extension for clamping said terminal, the bottom wall of said casing and said connecting member together, the bottom of said casing being provided within the casing with a groove extending from said opening therein beyond the outer edge of said connecting member; a detachable cover for said casing; and means for securing said cover in place.

2. A terminal connection for storage batteries comprising in combination, a battery terminal provided with an extension; a fluid-tight casing on the upper end of said terminal, said terminal extension projecting into said casing through an opening in the bottom of the casing; an electrical conductor having one of its ends projecting into said casing through a slot in a side of the casing, said slot having inclined side portions, the conductor being connected at said end with the terminal extension within the casing; a cover for said casing provided with a depending wedge-shaped portion adapted to coact, when the cover is in place, with the said inclined portions of said slot in the wall of the casing to form a fluid-tight joint between the cover and the casing and to coact with said conductor and casing to form a fluid tight joint about the conductor; and means for securing said cover in place.

3. A terminal connection for storage batteries comprising in combination a battery terminal provided with a threaded extension having a threaded opening in its upper end; an open-top casing provided with an opening in its bottom through which said terminal extension projects into the casing; an electrical conductor having one of its ends projecting into the casing through an opening in one of its walls; a connecting member attached to said end of the conductor and having an opening in its outer end through which the terminal extension projects; a nut on the threaded end of said extension serving to clamp said connecting member, the bottom of the casing and said terminal together; a cover for said casing having an opening therein; and a thumb screw passing through the opening in said cover and into the screw-threaded opening of said terminal extension to secure the cover in place.

4. In a device of the character described the combination of a battery terminal provided with a screw-threaded extension; an open-top casing mounted on the upper end of said terminal and into which said terminal extension projects through an opening in the bottom of the casing; packing interposed in said opening between the bottom of the casing and said terminal; an electrical conductor having one of its ends projecting into said casing through a slot in the side of the casing, said slot having inclined sides and a curved bottom in which said conductor rests; means for connecting said end of the conductor and said terminal extension within the casing; a detachable cover for said casing having at one end a depending portion provided with inclined sides and a curved lower edge to coact, when the cover is in place, with said slot in the casing to effect a tight joint about the conductor; and means for securing said cover in place.

5. A terminal connection for storage batteries comprising, in combination, an open-top casing body; a battery terminal having an extension projecting into said casing body; an electrical conductor projecting into said casing body and connected to the terminal; and a cover for said casing connected to said terminal extension, the cover serving to close the casing body and effect a fluid-tight joint between the body and said battery terminal.

6. A terminal connection for storage batteries comprising, in combination, an open-top casing body; a battery terminal on which said body is mounted; an extension member mounted in the outer end of said terminal and projecting into said casing body; an electrical conductor projecting into the casing body and connected to said terminal; and a cover for the casing connected to said extension member, said cover serving to close the casing body and effect fluid-tight joints between the conductor and the casing and the casing and the battery terminal.

In testimony whereof I have signed my name to this specification.

GLENN SPURGEON.